UNITED STATES PATENT OFFICE.

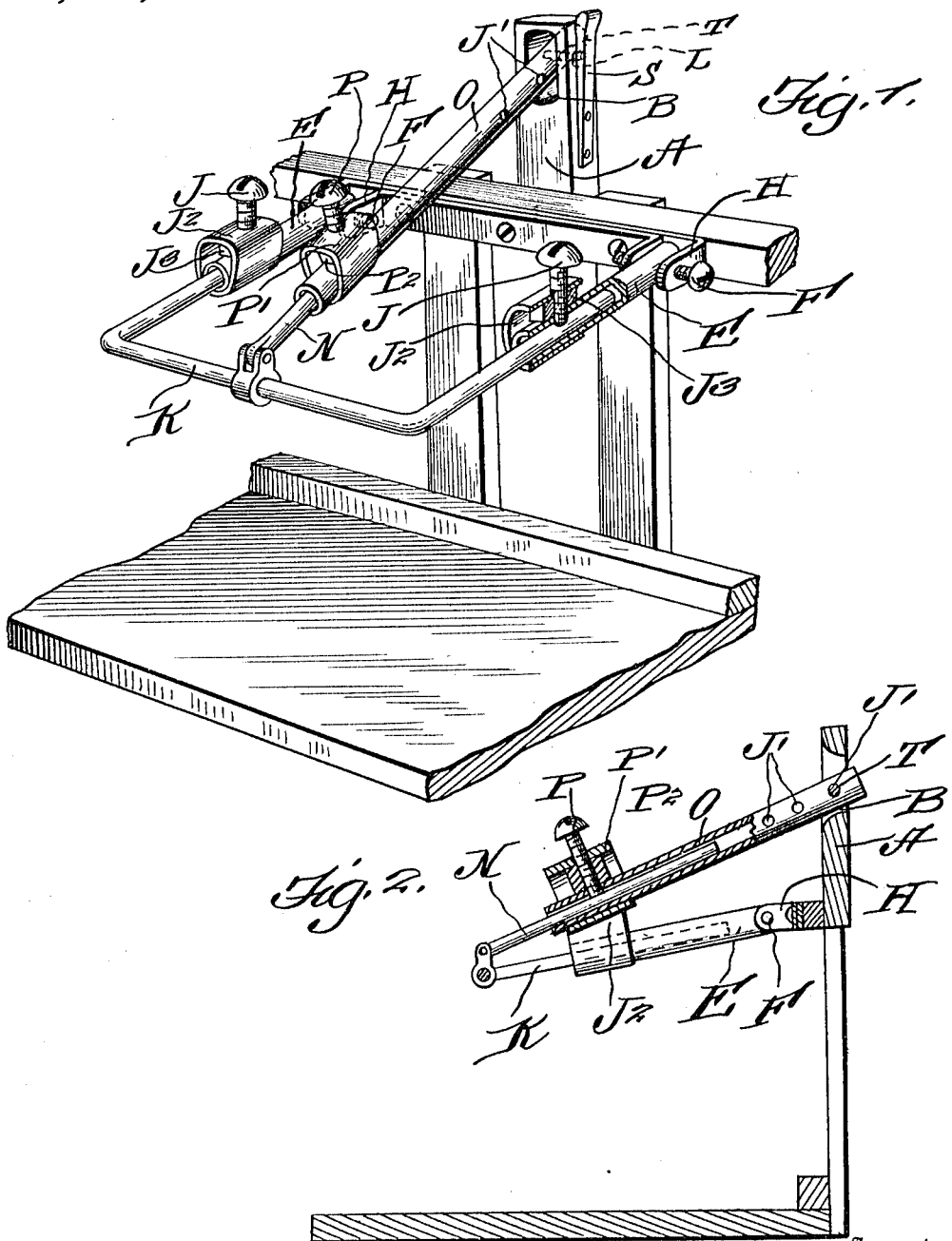

ALFRED L. CRAMER, OF COLBY, WISCONSIN.

ATTACHMENT FOR CATTLE-STANCHIONS.

1,079,166.  Specification of Letters Patent.  Patented Nov. 18, 1913.

Application filed May 24, 1913.  Serial No. 769,748.

*To all whom it may concern:*

Be it known that I, ALFRED L. CRAMER, a citizen of the United States, residing at Colby, in the county of Marathon and State of Wisconsin, have invented certain new and useful Improvements in Attachments for Cattle-Stanchions; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in stanchion attachments affording means whereby cows, when stanchioned, and performing an evacuation, will be caused to move back from the position usually occupied during feeding, in order that the excrement from the animal will fall into a gutter rather than upon that portion of the floor upon which the animal would naturally lie, thus producing more sanitary conditions than would be the case if the animal were allowed to lie upon a filthy floor.

The invention comprises various details of construction and combinations of parts as will be hereinafter more fully described and then specifically defined in the appended claim.

I illustrate my invention in the accompanying drawings, which, with the letters of reference marked thereon, form a part of this application, and in which.

Figure 1 is a side elevation of the device, showing same adjusted in an operative position relative to the back of an animal held by the stanchions. Fig. 2 is a sectional view vertically through the central portion of the apparatus.

Reference now being had to the details of the drawings by letter A designates an upright extension of the stanchion which is apertured as at B. Hollow shells E, are pivotally connected at their inner ends to the pivotal pins F, carried by brackets H, and telescoping within said shells are the ends of a bail shaped member K, which is held in adjusted positions by means of the set screws J passing through a shell $J^2$ and a filler $J^3$. A rod N is pivoted at one end to said member and telescopes within the shell O, being held in an adjusted position therein, by a set screw P passing through the shell P' and a filler $P^2$. A spring S, is fastened at one end to the extension A, and has a pin T secured thereto, which engages an aperture L in the wall of the aperture B, also registering apertures J' formed in the shell O, when it is desired to hold the member in an adjusted position.

When the device is adjusted for use, the member which is designed to be held in a horizontal position adjacent to the back of the animal, will prevent the animal raising its back above the same level during an evacuation, and thereby cause the excrement to fall into the trough or recess in the floor provided for its reception, rather than upon the portion of the floor upon which the animal is adapted to lie. By the provision of an apparatus embodying the construction of my invention, it will be apparent that the animal will be kept more cleanly than would otherwise be the case, were it not for the provision of the means which I employ.

What I claim to be new is,—

In combination with a stanchion provided with an upright extension, a bracket fastened to the stanchion, open ended shells pivoted to said bracket, a bail shaped member having its arms telescoping said shells, means for holding the ends of said member in adjusted positions, a rod pivoted to said member, a shell movable through an opening in said extension of the stanchion, a pin, a spring fastened to the extension and carrying said pin, the latter designed to engage an aperture in said rod to hold the same in an adjusted position.

In testimony whereof I hereunto affix my signature in presence of two witnesses.

ALFRED L. CRAMER.

Witnesses:
G. M. OUIMETTE,
R. J. JOHNSTON.

Copies of this patent may be obtained for five cents each, by addressing the "Commissioner of Patents, Washington, D. C."